United States Patent [19]

Ono et al.

[11] Patent Number: 5,663,827
[45] Date of Patent: Sep. 2, 1997

[54] POLYGONAL MIRROR OF SYNTHETIC RESIN AND PRODUCING METHOD THEREOF

[75] Inventors: Hiroshi Ono; Makoto Kunigoh, both of Ebina, Japan

[73] Assignee: Fuji Xerox Co., Ltd., Tokyo, Japan

[21] Appl. No.: 428,016

[22] Filed: Apr. 25, 1995

[30] Foreign Application Priority Data

May 31, 1994 [JP] Japan ................................ 6-117937

[51] Int. Cl.⁶ ........................... G02B 26/08; G02B 7/182
[52] U.S. Cl. ...................... 359/216; 359/855; 359/871; 359/900
[58] Field of Search ........................ 359/216–219, 359/855, 871, 872, 900; 264/1.1, 1.9

[56] References Cited

U.S. PATENT DOCUMENTS

| | | | |
|---|---|---|---|
| 4,560,862 | 12/1985 | Eastman et al. | 359/219 |
| 4,836,631 | 6/1989 | Shimazu et al. | 359/218 |
| 4,943,128 | 7/1990 | Takada et al. | 359/220 |
| 5,134,514 | 7/1992 | Munakoshi et al. | 359/216 |
| 5,296,959 | 3/1994 | Asai | 359/216 |

*Primary Examiner*—James Phan
*Attorney, Agent, or Firm*—Oliff & Berridge

[57] ABSTRACT

A polygonal mirror of synthetic resin of low cost and which is faithful to the desired standard mirror with respect to flatness, shape, size and other characteristics is made by improving the shape of the polygonal mirror. The mirror includes a plurality of reflection surfaces on side surfaces of a polygonal pillar and a concave fitting portion, which is made instead of a conventional through hole, in its center. The concave portion is used as a reference point for fitting the polygonal mirror over a scanner motor and a convex portion made in a scanner motor side fits into it. Instead of the concave fitting portion, a convex portion can be made in the center of the polygonal mirror with which a concave portion made in the scanner motor side fits.

4 Claims, 5 Drawing Sheets

POLYGONAL MIRROR OF SYNTHETIC RESIN AND PRODUCING METHOD THEREOF

FIELD OF THE INVENTION

The present invention relates to a polygonal mirror which deflects optical beam in an optical scanning device such as a laser scanner, and more in detail, to an improved polygonal mirror and the producing and installing methods thereof.

BACKGROUND OF THE INVENTION

FIG. 8 shows a conventional polygonal mirror 1. Usually, a polygonal mirror has a plurality of reflection surfaces 2 on its side surfaces and a through hole 3, for supporting a scanner motor (which is not shown in the figure) to rotate the polygonal mirror, in the center of the polygonal mirror. In making such a polygonal mirror, considerably high degree of flatness for the above described reflection surfaces 2, high closeness to a perfect circle in respect of a radius and an internal surface for the above described through hole 3 which is a reference point for fitting the scanner motor over the through hole 3 are necessary, and further, the distances between the center of through hole 3 and the ridge line for each reflection surfaces 2 must be uniform.

To make a polygonal mirror, such severe requirements must be satisfied, and conventionally, a polygonal mirror is made by applying a cutting process by diamond byte to a metal material such as aluminum, for which accurate cutting process is required and the producing costs are inevitably increased. Further, with a metal polygonal mirror, the increasing request to reduce the weight of a polygonal mirror, which is for reducing the burden laid on the polygonal mirror and reducing the vibration when rotating the polygonal mirror, cannot be obtained.

To solve these defects, a method wherein a polygonal mirror is produced by injection compression molding of synthetic resin has been proposed. Specifically, in this method, an injection molding container is used, and injection compression molding is carried out by injecting melted synthetic resin to a cavity of a metal mold under a low pressure and compressing the synthetic resin in the cavity by a compression core. As shown in FIG. 9, the mold used in this method comprises a pair of lower metal mold 5 and upper metal mold 6, which forms cavity 4 when they are combined. Upper metal mold 6 comprises compression core 7 for compressing the synthetic resin in cavity 4, convex portion 8 to make a through hole in the polygonal mirror is made in the above described lower metal mold 5, and concave portion 9 fitting the above described convex portion 8 when the upper and the lower metal molds are combined is made in the above described compression core 7.

However, when making, by injection compression molding of synthetic resin, a conventional polygonal mirror (shown in FIG. 8) wherein a through hole is made in the center, there are the following problems.

As melted resin injected into the cavity is hardened immediately after it is injected from the regions contacting the surface of the metal mold, that is, the regions shown by oblique lines in FIG. 10, when stuffing of the melted resin into the cavity is completed and the process goes to the stage of compression molding, the surface layer of the stuffed resin is already hardened. If a compression force is applied to the surface layer, excessive stress is caused there. Therefore, overall distribution of the compression force, which is made when the upper and lower metal molds are combined, to the stuffed melted resin is prevented, and the shape of the polygonal mirror becomes different from the desired standard one.

Further, as described above, as a convex portion to make a through hole in the center of the polygonal mirror is made in the center of the cavity, a gate for injecting melted resin into the cavity must be made in the portion off the center of the cavity. Therefore, as the melted resin injected into the cavity is stuffed into the cavity, being divided into two directions because of the convex portion which is in the way, a weld line inevitably occur at the position where the divided melted resin collide. If the weld line occurs on a reflection surface, the degree of flatness of the reflection surface is significantly reduced. Moreover, if a polygonal mirror with a weld line is used, being rotated at high speed for a long time, a crack tends to occur at the position of the weld line, by which reliability is reduced.

As a producing method wherein the occurrence of a weld line on a reflection surface is prevented, the one described in Japanese unexamined patent publication number Sho 63-304223 is known. In this method, pin point gates of the number corresponding to that of reflection surfaces are made radially in a metal mold, and melted resin is injected uniformly from each pin point gate toward a cavity, so a plurality of weld lines are caused at the ridge lines between two, adjacent reflection surfaces. With this method, although the occurrence of a weld line on a reflection surface can be prevented, the occurrence of weld lines themselves cannot be prevented completely, and the problem of reliability in a long-termed use remains as before.

As a producing method wherein the occurrence of weld lines can be prevented completely, the ones described in Japanese unexamined patent publication number Hei 3-304223 or Hei 4-175126 are known. In this method, a gate is provided at the position corresponding to the center of a cavity, and a shaft which also acts as a gate cutter and is once covered with the injected resin is moved up before the melted resin stuffed into the cavity is hardened completely, removing the resin on it, by which a through hole is made. With this method, as the melted resin injected into the cavity is stuffed into the cavity from the center, which corresponds to the position of the gate, being diffused radially, weld lines do not occur in thus made polygonal mirror. However, with this method, as the gate cutter is necessary, the metal mold inevitably becomes complicated and expensive. Moreover, since a through hole is processed when injection molding is almost completed, burrs tend to be caused at the end of the side, which faces the gate, of the through hole, by which the the accuracy of the shape of the aperture is reduced.

Certainly, it is possible to prevent the occurrence of weld lines by changing conditions, such as the temperature of the melted resin injected into the cavity, of the injection compression method, but the range of parameters with which injection compression molding is carried out is narrowed, causing the difficulty of making polygonal mirrors which are faithful to the desired standard one in respect of flatness, shape, size and others.

SUMMARY OF THE INVENTION

It is an object of the present invention to provide a polygonal mirror of synthetic resin to solve the defects found in the conventional arts.

It is another object of the present invention to provide a polygonal mirror of synthetic resin capable of being produced easily with a low cost and which is faithful to the desired standard one in respect of flatness, shape, size and others, by improving the shape of the polygonal mirror into the one optimum for the producing method thereof.

It is another object of the present invention to provide a producing method of thus improved polygonal mirror and a method wherein the polygonal mirror is fitted over a scanner motor.

Additional objects and advantages of the invention will be set forth in part in the description which follows and in part will be apparent from the description, or may be learned by practice of the invention.

To achieve the above described objects, the polygonal mirror of synthetic resin having a plurality of reflection surfaces on its polygonal pillar side surfaces according to the present invention has a concave fitting portion in the center of it instead of a conventional through hole. This concave fitting portion is a reference point for fitting the polygonal mirror over the scanner motor, and it is combined with a convex portion made in the scanner motor side. It is also possible to make a convex fitting portion in the center of the polygonal mirror and to make it combined with a concave portion made in the scanner motor side.

The concave or convex portion made in the center of the polygonal mirror according to the present invention is used for a reference point for positioning when fitting the polygonal mirror over the scanner motor. With a product made by injection molding, the lower the degree of non-uniformity in its shape is, the better product with less difference in size with respect to the desired standard one can be obtained, so, as a reference point for positioning, it is preferable to make the concave and convex portions small.

When making a polygonal mirror of such a shape, to prevent the occurrence of a weld line completely, the number of gate for injecting melted resin into a cavity of a metal mold for injection molding must be one. Further, to improve the flatness of reflection surfaces of the polygonal mirror, the melted resin must be stuffed into the cavity uniformly. Therefore, it is preferable to provide the gate in the center of the polygonal mirror.

With the present invention, as a through hole is not made in the polygonal mirror and therefore the occurrence of weld lines is prevented, when the polygonal mirror according to the present invention is fitted over a mirror flange of the scanner motor side, for example, conventional polygonal mirror fitting methods such as fixing the polygonal mirror to the mirror flange by a bis boring the polygonal mirror or fixing by pressure the polygonal mirror to the mirror flange by a mirror cap screwed to the rotation shaft of the scanning motor cannot be carried out. Therefore, the polygonal mirror according to the present invention is fixed to the mirror flange of the scanner motor by adhesion.

The polygonal mirror of synthetic resin according to the present invention has a concave or a convex fitting portion in the center, and this fitting portion can be as small as possible only if it can be used for the reference point for positioning when fitting the polygonal mirror over the scanner motor. Therefore, compared with a conventional polygonal mirror wherein a through hole is made, the regions where melted resin stuffed into the metal mold is hardened before the stage of compression molding can be considerably small, which prevents the occurrence of excessive stress to such regions. Therefore, a compression force caused when the metal molds are combined is conveyed fully to the melted resin stuffed into the cavity, and a polygonal mirror having a high degree of flatness can be made.

With the polygonal mirror of synthetic resin according to the present invention, as a through hole is not made unlike a conventional polygonal mirror, a weld line does not occur when injection molding is carried out and a crack corresponding to it does not occur in a long-termed use.

Further, as the structure of a metal mold used for injection molding can be considerably simple, a polygonal mirror according to the present invention can be made easily with a low cost.

BRIEF DESCRIPTION OF THE DRAWINGS

The manner by which the above objects and the other objects, features and advantages of the preset invention are attained will be fully evident from the following detailed description when it is considered in light of the accompanying drawings, wherein:

FIG. 1 (B) is a longitudinal cross-sectional view of the first embodiment of the polygonal mirror of synthetic resin according to the present invention.

FIG. 2 (B) is a longitudinal cross-sectional view of the second embodiment of the polygonal mirror of synthetic resin according to the present invention.

DETAILED DESCRIPTION OF THE INVENTION

EMBODIMENT 1

The polygonal mirror of synthetic resin according to the present invention is now described, referring to FIGS. 1 to 10.

Figure 1A:
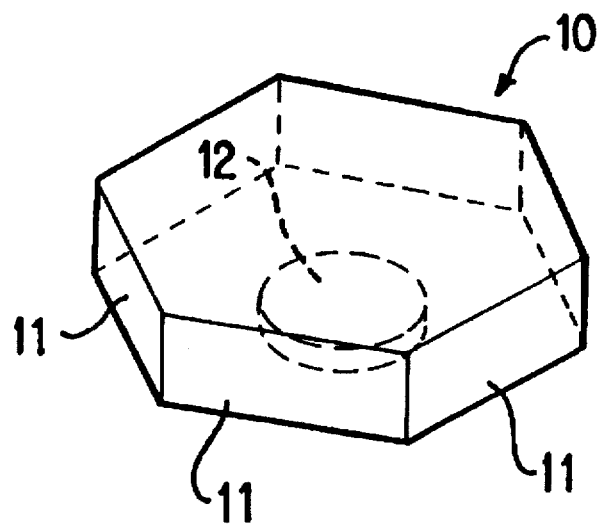
FIG. 1 (A) shows a perspective of a first embodiment of the polygonal mirror of synthetic resin according to the present invention.
Figure 1B:
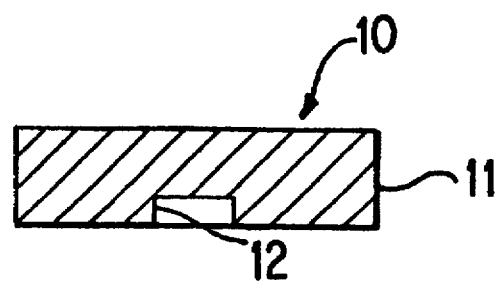

FIG. 1 shows a first embodiment of the polygonal mirror of synthetic resin according to the present invention. Polygonal mirror 10 comprises optical beam reflecting surfaces of six sides around the side surfaces of its polygonal pillar, and it has a concave fitting portion 12, in the center.

The above described concave fitting portion 12 is used for the reference point for positioning when polygonal mirror 10 is fitted over the scanner motor (not shown in the figure).

The above described polygonal mirror 10 is made by injection compression molding method for synthetic resin, and materials such as polycarbonate or amorphous polyolefin can be used. The above described reflection surfaces 11 are made, after the polygonal pillar is made by injection compression molding, by depositing a metal film comprising a material such as aluminum or copper on the side surfaces of the polygonal pillar and then depositing a protection film comprising a material such as $SiO_2$ on it.

EMBODIMENT 2

Figure 2A:
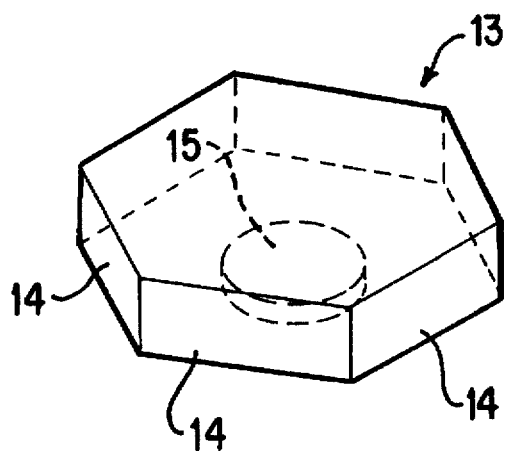
FIG. 2 (A) shows a perspective view of a second embodiment of the polygonal mirror of synthetic resin according to the present invention.
Figure 2B:
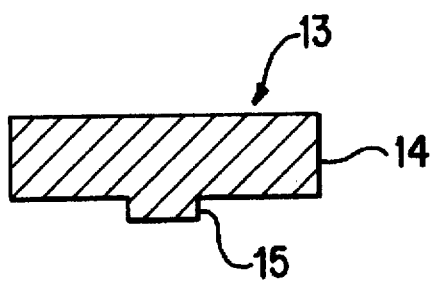

FIG. 2 shows a second embodiment of the polygonal mirror of synthetic resin according to the present invention. Polygonal mirror 13 comprises optical beam reflecting surfaces 14 of six sides on the side surfaces of the polygonal pillar, and in the center of it, convex engaging portion 15 is made. Convex engaging portion 15 is used for the reference point for positioning when fitting polygonal mirror 13 over the scanner motor (not shown in the figure). Here, the molding method, material for the polygonal mirror molding and reflection surface making method are the same as the first embodiment shown in FIG. 1.

Figure 3:
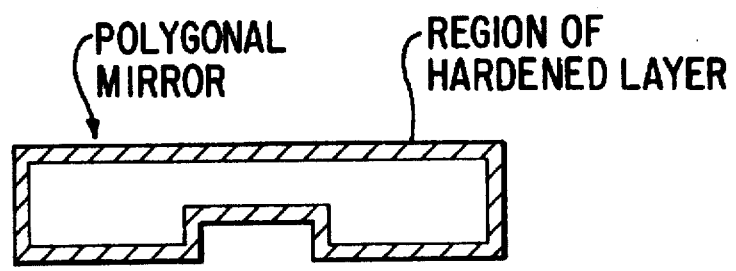
FIG. 3 shows the regions wherein a surface layer is hardened in the process of melted resin injection, when the polygonal mirror according to the first embodiment is made by injection compression molding.
Figure 10:
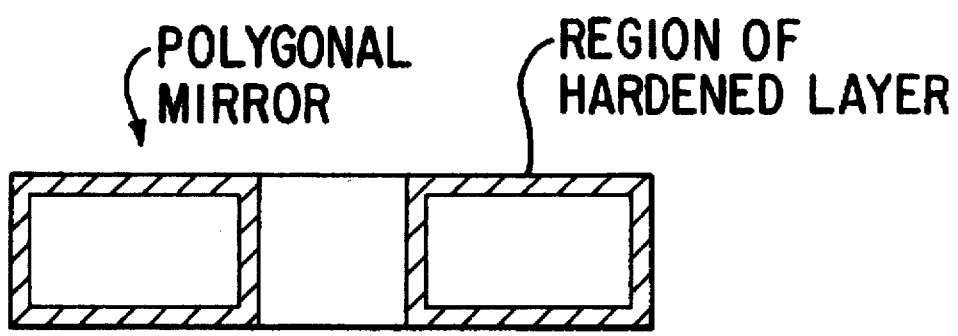
FIG. 10 shows the regions wherein a surface layer is hardened in the process of melted resin injection, when the polygonal mirror according to the conventional process is made by injection compression molding.

As the polygonal mirrors shown in these embodiments do not have through holes in their centers as conventional polygonal mirrors, the region where a surface layer is hardened immediately after the melted resin is stuffed into the injection molding metal mold is as shown by oblique lines in FIG. 3, and it is smaller than that of the conventional polygonal mirror shown in FIG. 10. Therefore, pressure used in the stage of compression molding is easily applied to the whole polygonal mirror, compared with the case where a through hole is made, by which reflection surface having high flatness can be obtained. Further, as the region where the surface layer hardened is smaller than that of a conventional polygonal mirror, the amount of excessive stress inevitably applied to the fitting portion, which is used for the reference point for positioning with respect to the scanner motor in the stage of compression molding can be reduced, by which the accuracy in size of the fitting portion is improved.

The matters which are important when fitting the polygonal mirror over the scanner motor are the degree of flatness of reflection surfaces with respect to the rotation shaft of the scanner motor and the distance between the rotation shaft and each reflection surface. With the polygonal mirror of each of the above described embodiments, as the accuracy in size of the engaging portion which is used for the reference point for positioning with respect to the scanner motor is improved for the above described reasons, the degree of accuracy when fitting the polygonal mirror over the scanner motor is improved.

Figure 4:
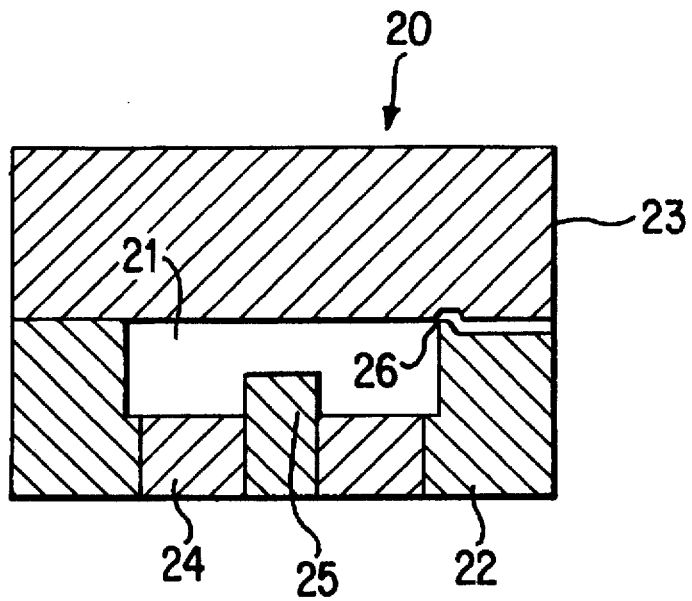
FIG. 4 is a cross-sectional view of the metal mold used for injection compression molding of a polygonal mirror according to the first embodiment.

FIG. 4 shows metal mold 20 for making the polygonal mirror shown in the first embodiment by injection compression molding. This metal mold comprises a pair of lower metal mold 22 and upper metal mold 23, which forms cavity 21 when they are combined, and lower metal mold 22 comprises compression core 24 for compressing melted resin in cavity 21 and which is movable in the direction reducing the volume of the polygonal mirror to be produced. Lower metal mold 22 have projecting portion 25 which corresponds to concave fitting portion 12 of polygonal mirror 10 and which is independent from the above described compression core 24, which slides with respect to projecting portion 25. In the metal molds shown in the figure, gate 26 injecting melted resin into cavity 21 is connected to a point around the circumference of cavity 21, specifically in a position corresponding to a ridge line between a couple of adjacent reflection surfaces 11.

Figure 5:
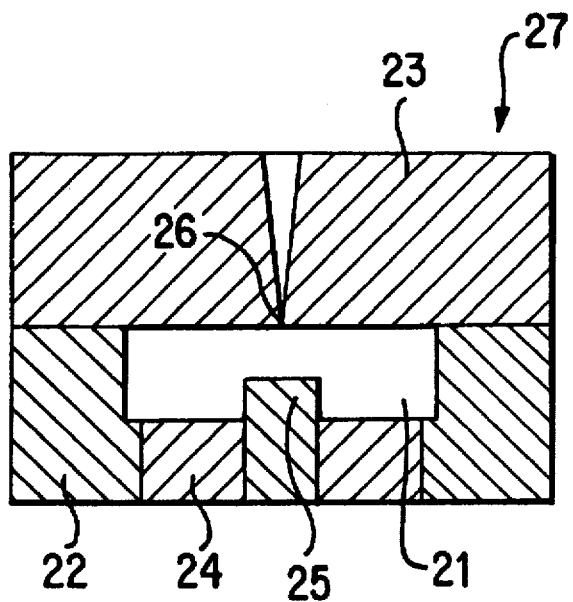
FIG. 5 shows a modified example of the metal mold shown in FIG. 4.

FIG. 5 shows a modified embodiment, wherein gate 26 is provided in the center of upper metal mold 23, that is, the position corresponding to the center of polygonal mirror 10, of the above described metal mold 20. Other points are the same as those of metal mold 20 shown in FIG. 4, and they are identified by the same reference indications.

When polygonal mirror 10 of the shape shown in the first embodiment is made by injection molding, using either of metal mold 20 or metal mold 27 which is shown in FIG. 4 and FIG. 5 respectively, as the melted resin injected into cavity 21 is not divided into directions, occurrence of a weld line in the molded polygonal mirror can be prevented completely. It is the same as when making a polygonal mirror of the shape shown in the second embodiment by injection molding.

When using metal mold 20 shown in FIG. 4, as gate 26 is connected to a point around the circumference of cavity 21, pressure drop is caused when melted resin is injected. With this metal mold, however, approximately uniform pressure can be applied to the whole polygonal mirror, and a polygonal mirror which is accurate in size can be obtained. Moreover, when using metal mold 27 shown in FIG. 5, as gate 26 is provided in the position corresponding to the center of cavity 21, melted resin can be stuffed into cavity 21 uniformly, and a polygonal mirror wherein the flatness of each reflection surfaces is uniform can be obtained.

The method for fitting polygonal mirror 10 of the shape shown in the first embodiment over a mirror flange of a scanner metal is now described.

Figure 6:
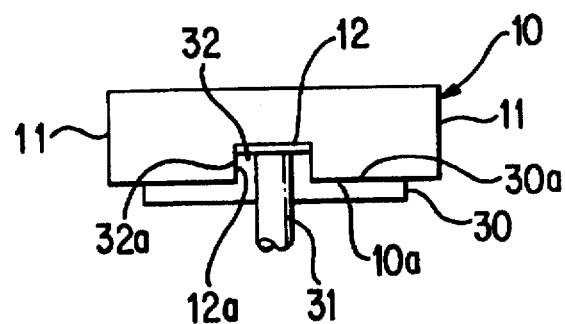
FIG. 6 shows the state wherein the polygonal mirror according to the first embodiment is fitted over a mirror flange.

FIG. 6 shows the state wherein polygonal mirror 10 is fitted over the mirror flange. In this figure, 30 is a mirror flange fixed to rotation shaft 31 of scanner motor, and polygonal mirror 10 is fixed on mirror flange 30. In the center of mirror flange 30, circular pedestal 32 is provided, being centered on the center of rotation shaft 31, and the center of polygonal mirror 10 is determined by the fitting of circular pedestal 32 over concave fitting portion 12 of polygonal mirror 10.

With such a fitting method, the distance between the center of rotation shaft 31 of scanner motor and each of reflection surfaces 11 of polygonal mirror 10 is determined when fitting internal surface 12a of fitting portion 12 is fitted over the external surface 32a of circular pedestal 32. The flatness of each reflection surface 11 with respect to the center of rotation shaft 31 is obtained by contacting, in the process of compression when molding, reference surface 10a, which is formed as a surface of high flatness by receiving direct and uniform pressure from compression core 24, of polygonal mirror 10 and the reference surface 30a, which is formed to be perpendicular with respect to the center of rotation shaft 31, of mirror flange 30.

Figure 7:
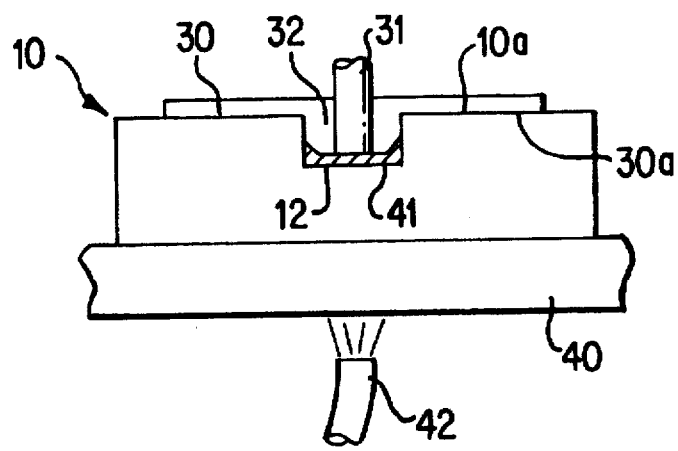
FIG. 7 shows the state wherein the polygonal mirror according to the first embodiment is fitted.
Figure 8:
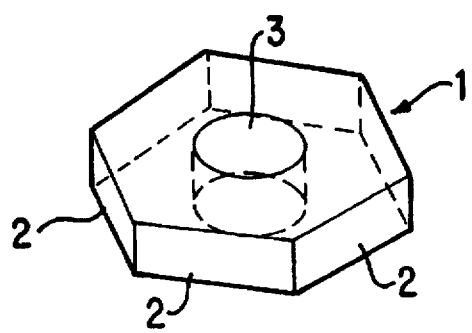
FIG. 8 is a perspective view showing a conventional polygonal mirror.
Figure 9:
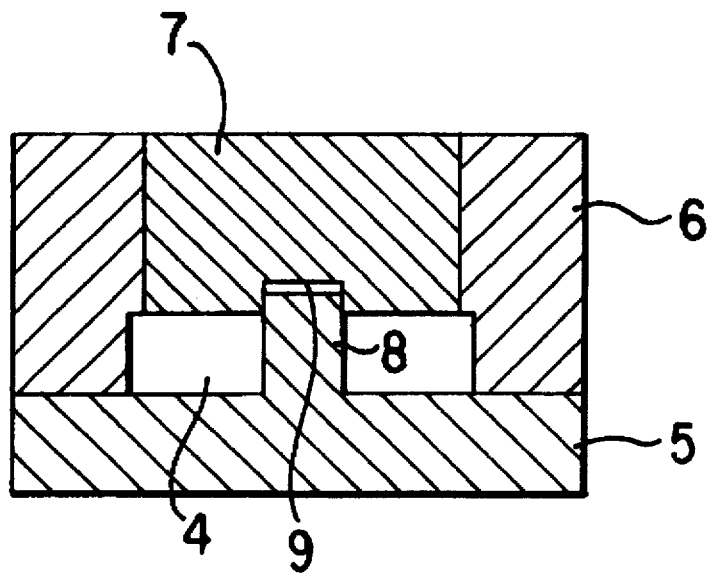
FIG. 9 is a cross-sectional view of the metal mold used for injection compression molding of a conventional polygonal mirror.

Polygonal mirror 10 is fixed to mirror flange 30 by adhesion, the state of which is shown in FIG. 7. Polygonal mirror 10 is fixed to mirror flange 30, in this order: placing, on transparent substrate 40 having a reference surface and transmitting ultraviolet ray, polygonal mirror 10 with its fitting portion 12 facing above; dropping an appreciate amount of of ultra violet ray hardening adhesive 41 on fitting portion 12 of polygonal mirror 10 and fitting circular pedestal 32 of mirror flange 30 in fitting portion 12 of polygonal mirror 10 (Here, adhesive 41 dropped on fitting portion 12 is pressed by circular pedestal 32 and spread in fitting portion 12, and the adhesive is lifted around the circumference of fitting portion 12); irradiating ultraviolet ray to the fitting portion by ultraviolet ray spot cure, from below reference substrate 40, with reference surface 10a of polygonal mirror 10 and reference surface 30a of mirror flange 30 contacted each other. Thus, adhesive 41 is hardened, and polygonal mirror 10 is fixed to mirror flange 30.

What is claimed is:

1. A method of producing a polygonal mirror of synthetic resin having a plurality of reflection surfaces on side surfaces of a polygonal pillar and a continuous fitting portion selected from the group consisting of concave and convex fitting portions, said method comprising injecting a melted resin from a gate toward a cavity made in a desired shape and compression molding said melted resin.

2. The producing method of said polygonal mirror of synthetic resin as described in claim 1, wherein said gate is provided corresponding to the center of said polygonal mirror.

3. The producing method of said polygonal mirror of synthetic resin as described in claim 1, wherein said fitting portion is concave.

4. The producing method of said polygonal mirror of synthetic resin as described in claim 1, wherein said fitting portion is convex.

* * * * *